US008561036B1

(12) United States Patent
Beans et al.

(10) Patent No.: US 8,561,036 B1
(45) Date of Patent: Oct. 15, 2013

(54) SOFTWARE TEST CASE MANAGEMENT (75) Inventors: Erik Beans, Sunnyvale, CA (US);
Daniel Khuong, San Jose, CA (US);
Praveen Vutukuru, Sunnyvale, CA
(US); Shelton S. Mar, Daly City, CA
(US)

(73) Assignee: Google Inc., Mountain View, CA (US)

( * ) Notice: Subject to any disclaimer, the term of this patent is extended or adjusted under 35 U.S.C. 154(b) by 1258 days.

(21) Appl. No.: 11/360,860

(22) Filed: Feb. 23, 2006

(51) Int. Cl.
*G06F 9/45* (2006.01)
*G06F 9/44* (2006.01)

(52) U.S. Cl.
USPC ............................................. 717/140; 717/124

(58) Field of Classification Search
None
See application file for complete search history.

(56) References Cited

U.S. PATENT DOCUMENTS

| | | | |
|---|---|---|---|
| 4,696,003 A | 9/1987 | Kerr et al. | |
| 4,864,569 A | 9/1989 | DeLucia et al. | |
| 5,577,198 A | 11/1996 | Willrett et al. | |
| 5,615,333 A | 3/1997 | Juettner et al. | |
| 5,742,754 A | 4/1998 | Tse | |
| 5,751,941 A | 5/1998 | Hinds et al. | |
| 5,960,196 A | 9/1999 | Carrier, III et al. | |
| 6,002,869 A | 12/1999 | Hinckley | |
| 6,011,830 A | 1/2000 | Sasin et al. | |
| 6,067,639 A | 5/2000 | Rodrigues et al. | |
| 6,148,277 A | 11/2000 | Asava et al. | |
| 6,408,403 B1 | 6/2002 | Rodrigues et al. | |
| 6,536,036 B1 * | 3/2003 | Pavela | 717/125 |
| 6,601,018 B1 | 7/2003 | Logan | |
| 6,694,509 B1 * | 2/2004 | Stoval et al. | 717/124 |
| 6,804,796 B2 | 10/2004 | Gustavsson et al. | |
| 6,934,656 B2 * | 8/2005 | Norman et al. | 702/117 |
| 7,039,902 B2 | 5/2006 | Kuzmin et al. | |
| 7,093,238 B2 | 8/2006 | Givoni et al. | |
| 7,284,237 B2 * | 10/2007 | Blumenthal et al. | 717/124 |
| 7,506,320 B2 * | 3/2009 | Bhandari et al. | 717/133 |
| 7,577,946 B2 * | 8/2009 | Murakami et al. | 717/145 |
| 2003/0093716 A1 * | 5/2003 | Farchi et al. | 714/34 |
| 2003/0121025 A1 | 6/2003 | Farchi et al. | |
| 2003/0139906 A1 | 7/2003 | Barford | |
| 2003/0167423 A1 * | 9/2003 | Murakami et al. | 714/38 |
| 2003/0212661 A1 * | 11/2003 | Avvari et al. | 707/2 |
| 2003/0212924 A1 | 11/2003 | Avvari et al. | |
| 2004/0010735 A1 | 1/2004 | Paternostro et al. | |
| 2004/0133880 A1 | 7/2004 | Paternostro et al. | |
| 2004/0255275 A1 | 12/2004 | Czerwonka | |
| 2005/0044533 A1 | 2/2005 | Nesbit et al. | |
| 2005/0160321 A1 | 7/2005 | Cleaveland et al. | |
| 2005/0166094 A1 * | 7/2005 | Blackwell et al. | 714/38 |
| 2005/0193291 A1 * | 9/2005 | Subramanian et al. | 714/710 |
| 2008/0120601 A1 * | 5/2008 | Ashida et al. | 717/124 |
| 2011/0145788 A1 * | 6/2011 | Xu et al. | 717/121 |

* cited by examiner

*Primary Examiner* — Li B Zhen
*Assistant Examiner* — Evral Bodden
(74) *Attorney, Agent, or Firm* — Birch, Stewart, Kolasch & Birch, LLP (57) ABSTRACT

A computer-implemented method of identifying software test cases to be executed is discussed. The method includes determining one or more features changed in a software project, correlating the one or more features with one or more secondary source code files that exhibit the one or more features, and identifying test cases to be executed based on the correlation between the one or more features and the one or more secondary source code files.

20 Claims, 8 Drawing Sheets

512 → Export in XML | Import Results ← 514

---

Test Case 1 of 2: "Test of First Feature" ← 502A

Objective: To test first feature. ← 504

| Pre Condition | Procedure | Verification | |
|---|---|---|---|
| Schema creation ← 506 | | Sample data ← 508 | Result<br>○ Pass<br>○ Fail } 510<br>○ Pending<br>○ Not in use |

---

Test Case 2 of 2: "Test of Second Feature" ← 502B

Objective: To test first feature.

| Pre Condition | Procedure | Verification | |
|---|---|---|---|
| Schema creation | | Sample data | Result<br>○ Pass<br>○ Fail<br>○ Pending<br>○ Not in use |

SOFTWARE TEST CASE MANAGEMENT

TECHNICAL FIELD

The inventions in this document relate to automated software engineering systems and methods, and more particularly to features relating to test case management.

BACKGROUND

Modern software applications and systems can be extremely complex, and may contain thousands or millions of lines of interrelated code spread across numerous files. Modern programs are also more interdependent than ever on other programs, as internet-based and other networked or otherwise connected systems continue to supplant stand-alone applications. Such networked applications may depend on many other programs to pass them appropriate data in order to run properly and without errors. Complex software systems carry with them a great risk of errors, such as so-called bugs.

Software generally goes through a number of iterative revisions as it moves from conception to initial launch (e.g., in alpha or beta test), and then through to commercial release. The process of identifying and tracking problems in software code is generally referenced as quality assurance (QA), and entire departments may be devoted to such a function. One way that QA engineers attempt to identify problems in software for later eradication is known as a "test case." A test case is a set of conditions or variables under which a tester (whether human or machine) may determine whether a requirement for the operation of a piece of software is satisfied. A written test case can include a description of the functionality to be tested (taken, e.g., from the requirements for the software, or from use cases, such as specific examples of how the software is intended to be used), and the expected output of the case, so that the functionality can be verified as working correctly. As a simple example, an engineer may test a piece of software for adding two numbers together by running the software using two exemplary numbers, and checking whether the output matches the output that is expected. As a more realistic example, an engineer may populate a database that is to be accessed by a program with information, and then may query the database using the program to see if the appropriate data is returned and presented.

An engineer often sets a known input for the software and determines an expected output before running the software on the test case. For example, for software to add two numbers, the engineer may choose to pass 4 and 6 to the program as arguments. If the software outputs 10, then the requirement for the test case will be satisfied. In more complex software, it may take many test cases to determine whether a requirement is actually satisfied. In addition, test cases may have to be re-run as software is modified from early versions through later versions, e.g., to add functionality or to eliminate bugs. Each version of compiled and tested software is often referenced as a "build" of the software. Test cases generally need to be run for every build. A collection of test cases is often referenced as a test suite.

Generally, QA engineers can use a test case management system during testing to help them plan testing, run the tests or test cases, and report the results of the testing. For the plan, the system may create trackable and loggable test cases to test one or more functionalities of an application, and associate test cases with a particular bug or feature. For the run, the system may determine a sequence of test cases that need to be run, and may run through the test cases and log the results in a database. For the reporting, the system may find information about test cases that were run on a specific "build" of the software, and may track progress of software during the QA cycle. The reporting may also report on code coverage, along with load and performance statistics and test progress, among other things.

SUMMARY

This document describes systems and methods for assisting in the generation and management of test cases. In general, the systems and methods may identify files that have been changed during a software coding cycle (such as by using a changelist generated by programmers or a revision control system), then identify features associated with those changed or "touched" files, such as by looking in feature files that correlate certain software features with particular files or groups of files (e.g., folders). The systems and methods may then find other files that correlate with the identified features and include those additional, secondary files in a test case profile along with the initial, primary files. The system and methods may be implemented and managed relatively simply by placing feature files in the folder hierarchy in which the source code itself resides, so that programmers can easily locate and update feature files, and the systems may readily locate the features in the feature files (e.g., by traversing the hierarchy upward).

In one aspect, a computer-implemented method of identifying software test cases to be executed is disclosed. The method comprises determining one or more features changed in a software project, correlating the one or more features with one or more secondary source code files that exhibit the one or more features, and identifying test cases to be executed based on the correlation between the one or more features and the one or more secondary source code files. The method may also comprise obtaining an identification for one or more primary source code files, and correlating the features with the primary source code files before correlating the features with the secondary source code files.

In some implementations, the primary source code files may be comprised of a list of files in one or more changelists. Also, a changelist may be obtained from a revision control system, and the features may be contained in file at or above a directory containing the primary and secondary files. The method may also comprise searching for the feature file in successively higher directories at or above a file referenced in a changelist until a feature corresponding to a file in the changelist is located. In addition, the secondary files may be correlated with the features by analyzing a list of features, each of which has one or more corresponding files or group of files.

In other implementations, a group of files may be represented by a computer directory of files, and may be correlated to features in a particular directory. Moreover, the list of features may be contained in a file in a directory at or above a directory containing the list of files. The method may further comprise prioritizing test cases for execution by identifying dependencies between files in the software project, and may also comprise executing the test cases in order of priority and generating a test case report reflecting a reliability indication of the software project. In addition, a test case profile that identifies test cases to be run in a software quality assurance cycle may also be generated by the method, and the test case profile may be transmitted in the form of an XML message for automated execution by a test case system.

In another aspect, a test-case generation system is disclosed. The system comprises a file parser to identify changes made to source code in a software development system, a document searcher configured to use information derived from the file parser to identify software features associated with source code files in the software development system, and a correlation module operatively coupled to the document searcher configured to identify files other than files operated upon by the file parser that share features identified by the document searcher. In addition, the system may also comprise a database of hierarchically arranged source code files storing the source code in the software development system. The file parser may also identify changelists entered into the system and parse files that have been changed from the changelists. In addition, the system may further comprise a test case profile generator to identify a list of test cases using the files that shares features identified by the document searcher.

In yet another aspect, a test-case generation system is disclosed that comprises a source code database containing a plurality of source code files for a software development project, a means for identifying changed files in the source code database and for identifying files that correspond to the changed files through a sharing of a common feature or features, and a test case generator operatively connected to the means for identifying, and configured to generate a collection of test cases associated with the changed files and the files that correspond to the changed files. In some implementations, the source code database may comprise one or more changelists and a plurality of feature files stored hierarchically with the source code database. In yet another aspect, a computer-implemented method of identifying software test cases to be executed is disclosed. The method comprises determining one or more files changed in a software project, correlating the one or more files with one or more software features, and correlating the one or more software features to one or more test cases for execution on the software project. The method may further comprise accessing a changelist to identify the one or more files changed in the software project. In addition, the method may comprise identifying a file identifying the one or more features based on the hierarchical relationship between the file location and the location of the one or more files changed in the software project.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
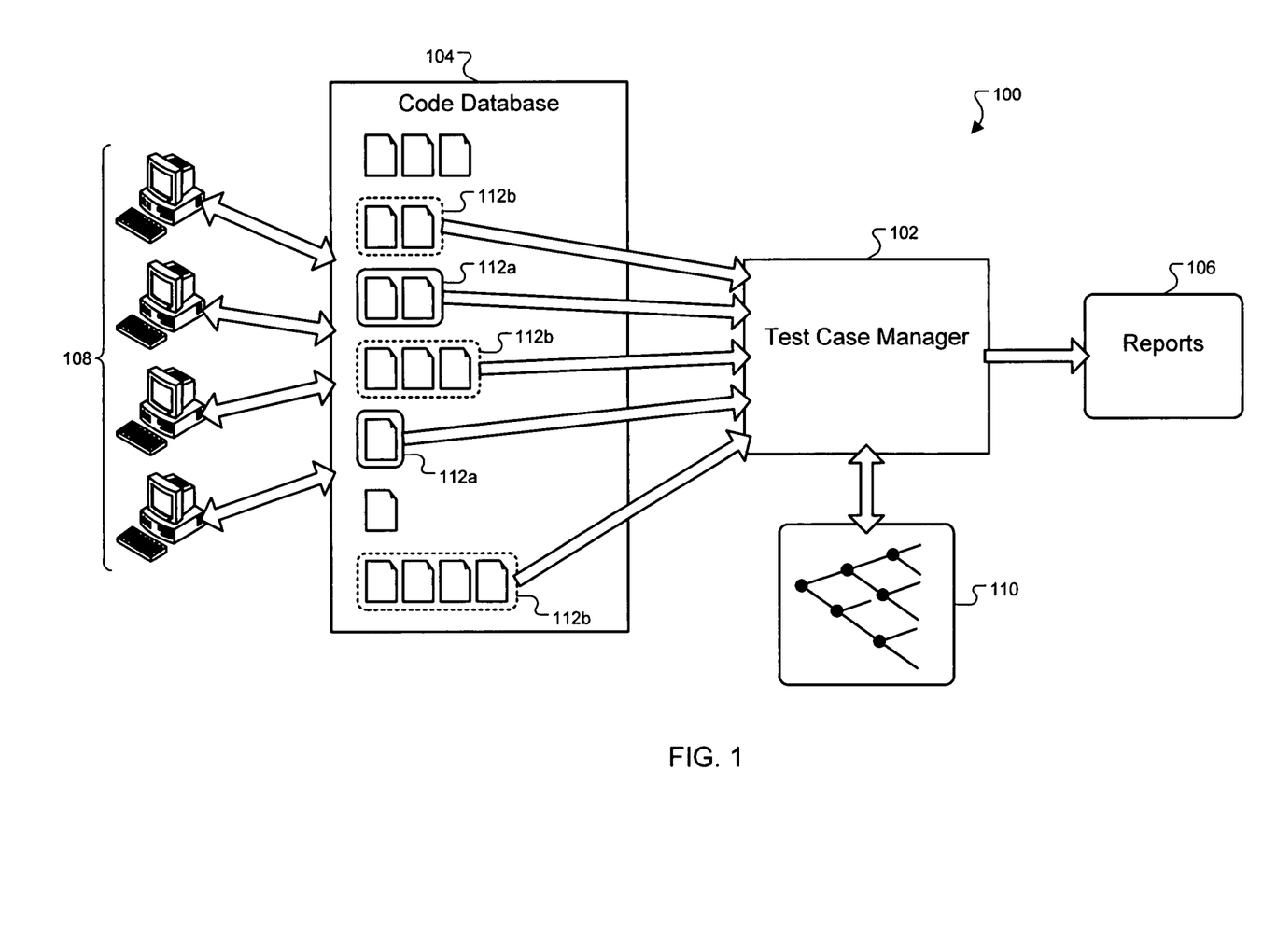
FIG. 1 is a schematic diagram of an example of a system for identifying software test cases to be executed.

FIG. 1 is a schematic diagram of an example of a system 100 for identifying software test cases to be executed. In general, programmers at programming consoles 108 produce source code that is stored and tracked in a source code database 104. A test case manager 102 accesses the code, and determines which code should be tested to help ensure that the code is operable and bug-free. In the system 100, the test case manager 102 makes use of changelists (not shown) and feature files 110 that may be produced by the programmers, in order to determine both primary files that have been changed and secondary files that may be affected by such changes. In this manner, the case manager may remove from programmers or QA engineers the need to manually identify test cases for testing the changed files by automatically determining links between the files based on features that are in the files and that have been affected by changes in the code.

At its general level, the system 100 includes the test case manager 102 that retrieves data from the source code database 104 and outputs reports 106 based on the received data, and upon analysis of the code in the database 104. The source code database 104 includes files that contain the programming, or source, code of a software application or applications. Programmers at programming consoles 108 may create, delete, and/or update the files within the code database 104. The consoles 108 may include, for example, personal desktop computers, laptop computers, or workstations running an appropriate operating system such as Microsoft Windows, UNIX, Solaris, or Linux. The consoles 108 may also operate an appropriate programming environment with programming tools, to assist the programmers in the process of creating, locating, and maintaining their code.

In some implementations, the code database 104 may be managed by a revision control system (RCS), such as the commercially available RCS Perforce (www.perforce.com). Such a system may be configured to track changes made to files in the code database 104. As a result, a programmer or a computerized system may be able to determine what changes have been made to the code from one version to another, and by whom the changes were made. In addition, the system may permit for reconstruction of the code at various points by tracking "deltas" between various versions of the code.

Programmers may also identify changes that have been made to the code by maintaining changelists, such as through the revision control system. The changelists may store and provide information that may be used by system 100 to determine what changes have been made in the code database 104. For example, where programmers have made edits to particular files since a prior "build" or version of the code base, the changelist may indicate which files have been changed. The changelists may, in appropriate circumstances, also indicate at which stages in the development of the code the changes have been made.

Where changes have been made during a programming cycle, a changelist may comprise a number of identifiers for, or pointers to, files that have been touched by programmers during the coding. For example, such files may include files that were changed to fix and eradicate (or at least attempt to eradicate) a bug in the software. Such a file or group of files may then serve as an input to the system 100 to begin a process of determining which files have been affected either directly or indirectly by the changes in the code during the cycle.

One or more feature files 110 map the files in the code database 104 to features of the software application. In addition, each feature of the software application is associated with a particular test case. A feature is a functionality of the software, or an item relating to such functionality, usually defined by a specification (whether formal or informal) for the software. A feature is typically an expected behavior of a software application that may be added to the software incrementally. For example, an application that interacts with a user could have a login page to look up users in an LDAP directory and verify a password—the login page functionality would be a feature. Likewise, a feature of a test case system could be the exporting of test cases in a comma separated value (CSV) format, or a similar format, so that the test cases may be used by another application.

As indicated by the figure, the feature files 110 may be organized as part of a hierarchical organization system, such as in a standard folder and sub-folder file management or document management system. Multiple feature files 110 may be spread across the hierarchy, where each file relates to source code files in its folder or in sub-folders below the folder in which it is stored. As explained more fully below, this hierarchical arrangement of feature files 110 may allow for simplified and flexible use of the feature files to identify particular software features and also to identify files that relate to such features. In particular, where the system determines that certain files or features have been changed during a coding cycle (e.g., using changelist information and perhaps other information), it may locate the feature files in the folders above the changed files or the feature files containing the changed feature. It may then look in the feature file to determine what other folders of files or files contain the same or related features, or what test cases relate to the features. It may then use such information to add the test cases associated with those features to the profile.

The files that have been indicated as having been changed, e.g., via a report from an RCS system, are shown in the figure for illustrative purposes as primary files 112a and secondary files 112b. The primary files are files that are indicated as having been changed during a coding cycle, e.g., through changelists 110 and/or an RCS system. The secondary files 112b are files that are connected in some relevant manner to the primary files 112a in a manner that indicates that they are associated with a test case. For example, the primary files 112a may be connected via feature files to a number of features—where the system indicates either that the files have been changed during the coding cycle or that the features have been changed. The features exhibited in the feature files may then be used to identify other files having the same features. Those other files may then be identified or tagged as secondary files 112b.

The reports 106 generated by test case manager 102 may indicate software test cases to be executed based on the received data. For example, the report may include a list of files that were changed in order to ensure that the goal of a testing cycle is met, e.g., that the software is operated to a sufficient extent so as to include that a particular bug has been successfully removed from the code. The test case or test cases may also take certain input variables, which may be stored separately from the programming code, but in a location accessible to the operating application. For example, where the application is a search program, the data may include one or more exemplary search requests and a relatively large sample of responsive data. In such a situation, the test cases may involve the application of a variety of the search terms to one or more parts of the application.

Where multiple test cases are required, and particular data about the test cases is also to be referenced, the combination of information may be referenced as a test suite. Reports 106 may be in the form of such test suites, in that test case manager 102 may draw from various data sources, and not just the code database 104, changelists, and feature files 110 to generate the reports 106.

The reports 106 may consist simply of information needed to operate a test case, such as identifiers for, or pointers to, files to be compiled and/or run and data for inputting to the software (and perhaps data to which outputs should be compared, along with URLs). The reports 106 may also contain additional information, either as part of a single file or a group of related files. For example, the reports 106 may include an introduction that includes a unique identifier for the test case/suite, an identifier for the owner or creator of the test case/suite, a version of the test case/suite represented by the report, a description of the reason for the test case/suite (e.g., for later reference, similar to comments in source code), a description of the requirement to be tested by the test case (e.g., operation of a certain portion of the software without errors), and dependencies in the test case. In addition, the reports 106 or test cases in the reports 106 may contain a detailed written procedure for an engineer to conduct testing, or which describes what the automated test actually does during the test.

The dependencies may include, for example, the order in which certain files are to be run or test cases are to be run. For example, the outcome of certain test cases may be known to be dependent on the outcome of other test cases. As such, the test cases may be ordered by the test case manager 102 to meet such a requirement. Also, test cases may be fighting for limited testing resources—whether in the form of QA engineers or server time for conducting testing. As a result, test cases having a higher importance may be prioritized so that the reports 106 cause those test cases to be run first. In addition, test cases that require a high level of resources compared to their returns may be demoted in the order of test cases. Moreover, in a test case suite, complicated tests that are most likely to create problems may be placed first so that other files are not tested needlessly, e.g., if there are dependencies between and among the test cases. Alternatively, the complicated test cases may be placed later to ensure that at least some test cases can be successfully tested and cleared, e.g., where there are close interdependencies between and among the test cases. In addition, certain test cases may have results that must be used by other test cases, or may otherwise have to be run before other test cases; in such a situation, those test cases may receive a higher priority.

A secondary report or reports may also be generated after the test cases have been run. Such reports may indicate whether any files or test cases generated errors. They may also indicate any correspondence or lack of correspondence between results that were expected for the test cases, and those that were actually produced. In addition, as discussed more fully below, a report may be exported, such as in the form of an XML file, that lists the test cases. One example of such a report is as follows:

```
<profile>
    <testcase_group basepath="proj/feature1/script.sh">
        <testcase automated="true|false" name="">
            <environment>
                <os>WIN_XP</os>
                <browser>IE</browser>
```

-continued

```
        <user>...</user>
    </environment>
    <objective>...</objective>
    <precondition>...</precondition>
    <procedure>...</procedure>
    <verificationSteps>
        <assert name="">...</assert>
        <assert name="">...</assert>
    </verificationSteps>
    <data>
        <item name="">..</item>
        <item name="">..</item>
    </data>
    .....other testcase data....
    <dependent_testcase>
        <testcase>...</testcase>
    </dependent_testcase>
    </testcase>
    </testcase_group>
    <testcase_group>...</testcase_group>
</profile>
```

In operation, system 100 may initially identify changes made in the code database 104 during a coding cycle, e.g., by referring to changelists provided by programmers or by an RCS system. Also, the test case manager 102 may obtain from the code database 104 a list of files 112 that have been changed by the programmers at the programming consoles 108. The list of files may be, for example, a list of files changed since the last test was performed or a list of files changed in a particular revision of the code for the software application, such as information in a changelist. Alternatively, or in addition, particular features may also be identified as features to be tested by a testing cycle.

Where the changes are provided via changelists, those lists may include information that indicates which files have been changed. The system 100 may then locate those files in the storage hierarchy of the code database 104. Next, the system 100 may look for a feature file 110 corresponding to each changed file, traversing up the folder hierarchy until an appropriate feature file 110 is located. Where the changes are identified directly by features, all of the feature files 110 may be searched to determine if that reference the identified feature or features.

The feature files may be located at each node in the hierarchy or only at some nodes, including only at the root directory. Placing feature files at each node, or in each subdirectory may have the benefit of minimizing the size of each feature file and placing the feature file closer to the code, so that each programmer may have more direct access to, and control over, "his" or "her" feature file. Using fewer feature files closer to the root directory may have the advantage of permitting more grouping of files affected by a feature (e.g., by folder or sub-folder) and of imposing uniformity in the manner by which feature files are formatted. Programmers may also save time on code maintenance by placing a feature file at a higher directory when all of the files in a particular directory contain a feature; in this manner, they can avoid having to write out all of the files they create, and associate them with a particular feature.

Each of the feature files may contain references to multiple source code files or to folders in the storage hierarchy, as explained in more detail below. The system 100 may use these associations between files, through features associated with those files, to identify the secondary files that may need to be identified for a test case or test case suite. For example, a feature file may consist of an ordered list or other arrangement of features, with each feature followed by a separated list of folders or files having the feature. When one of those file is indicated as a primary file, the remainder of the files or folders in the separated list may be identified as secondary files.

Figure 2A:
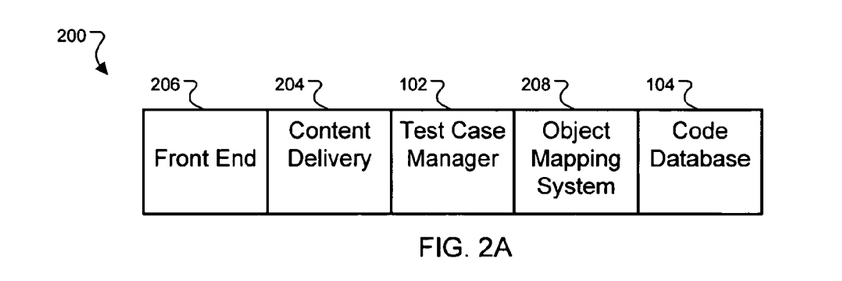
FIG. 2A is a block diagram of an example of modules within a system for identifying software test cases to be executed.

FIG. 2A is a block diagram of an exemplary system 200 for identifying software test cases to be executed. The system 200 may be implemented using various software module structures for implementing the features of the system 200. Generally, the system is shown for clarity in a layered format, so that each module simply needs to interact with the next adjacent modules. A modular system allows the test case manager 102 to be integrated with preexisting software modules. In addition, various modules may be changed or updated as necessary without the need for making extensive changes to other modules, e.g., where the modules simply need to take arguments from, or provide arguments to, other modules.

As one exemplary implementation, the system 200 may be wrapped around a code database 104 that may be used to store the various source code files and associated files for various software projects. The database 104 may also be used to store other information, or the information may be broken up across multiple databases. The particular form of the database 104 is not essential, and the database 104 may use a commercially available relational database management system or a database maintained by a revision control system.

The test case management system 200 may interact with a database such as a MySQL (www.mysql.com) database for the storage, management, and access of test cases (which may consist of name, version, procedure description, link to automated script(s), etc.). The test case management system 200 may obtain changelists from the revision control system (and both systems may be made part of a common integrated system), and may determine the location of the source code from the changelist. It may use the RCS depository to find the appropriate directory, and then search for the appropriate feature file in the directory to identify the relevant feature name.

An object mapping system 208 provides the test case manager 102 with access to the code database 102. The access mapping system 208 may include an object-relational mapping solution such as that provided by Hibernate (www.hibernate.org). The object mapping system 208 maps structured query language (SQL) data in the code database 104 to objects within an object-oriented programming language, such as Java. As a result, the object mapping system 208 may allow for much more simplified access to the data, serving as an abstraction layer, so that other components do not need to compose and issue detailed SQL arguments.

The test case manager 102 integrates with the other components to, for example, draw information from them (e.g., pulling database information or obtaining user input via a user interface) or provide information to them (e.g., by writing to the database or generating test case reports or profiles). The test case manager 102 generally directs the operations that result in the creation of test cases or test case profiles. For example, the test case manager 102 may draw upon changelists and feature files in the code database 104 to determine what files have been touched during a coding cycle and to determine which other files have been affected indirectly through the changes, such as by having features in common with the touched files. Test case manager 102 may receive, through other components, instructions for searching the code database 104, such as instructions to begin the generation of a test case profile, along with identifying information (e.g., a name for the profile, a purpose of the profile, and identifying information for the profiles "owner"), and may provide information such as a test case profile in an XML format that can be reviewed by users or used by other applications.

A front end 206 provides users with access to the test case manager 102 through, for example, a content delivery module 204. The content deliver module 204 may include various operational frameworks, such as the commercially available Web Work framework (www.opensymphony.com/webwork). In turn, the front end module 206, may be any appropriate interface for presenting information such as information arranged in forms for users to complete, to users for their interaction with the system 200. The front end module 206 may be an application such as a web server using JavaServer Pages (JSP), JavaScript, and JavaServer Pages Standard Tag Library (JSTL). The front end module 206 provides a user interface where a user may, for example, select test cases to be executed or a particular revision of the software application to be tested.

Figure 2B:
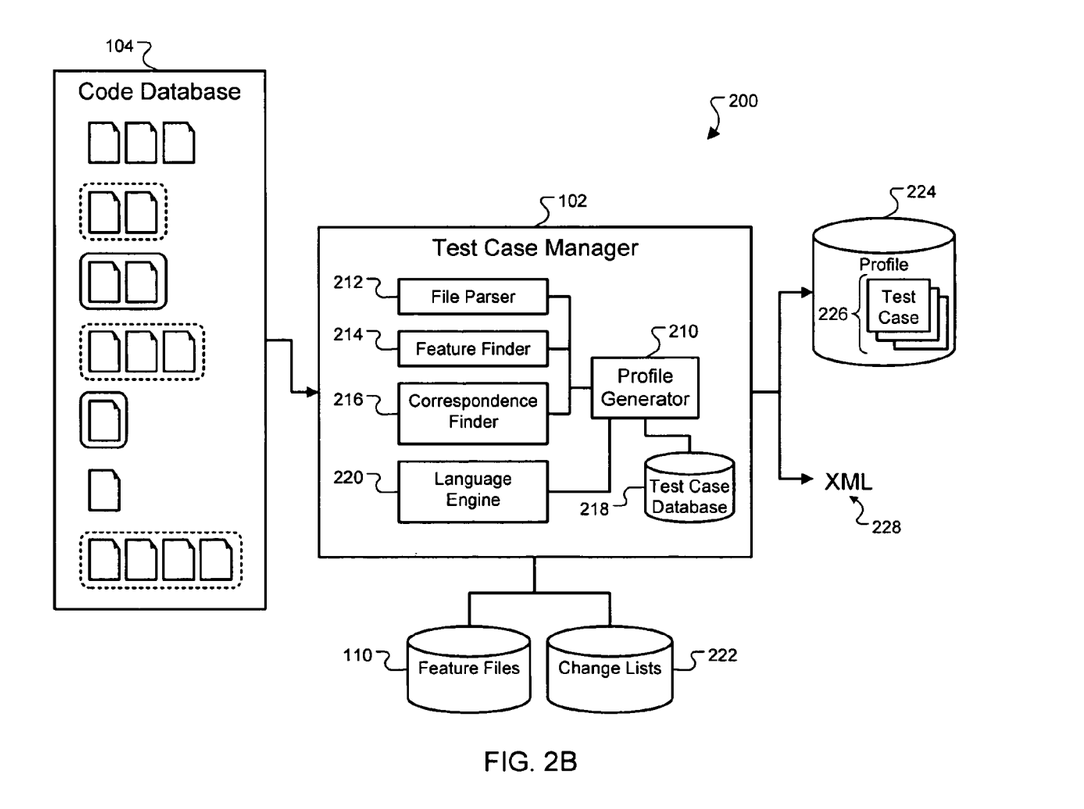
FIG. 2B is a block diagram of an example of a system for identifying software test cases to be executed.

FIG. 2B is a block diagram of an example of the system 200 for identifying software test cases to be executed. In general, the system 200 draws upon source code database 104, along with feature files 110 and changelists 222. The system 200 operates upon these inputs (and perhaps others, as needed) to produce various reports, such as a test case profile 224 and various other outputs, such as XML messages 228 for review by users or by other applications or systems. The system generally uses a file parser 212 to identify relevant change information, such as information contained in or referenced by changelists 110. A feature finder 214 searches for features associates with the changes, such as by looking for correspondence in feature files 110, and a correspondence finder 216 identifies other files or folders associated with the particular features. A profile generator 210 draws on these modules to produce a test case profile, which may include a list of test cases to be run for a particular cycle, along with the order in which the test cases are to be run.

The file parser 212 parses one or more changelists 222 to determine the files that have been changed in the revision or revisions of the software application to be tested. The parser 212 may be configured to recognize particular types of files or forms of file names in order to identify the appropriate files in which to perform the parsing. The parser 212 may then access the text in the files and extract relevant portions of that text. The parser 212 may be implemented in Java, JavaScript, PERL, or other appropriate languages.

In some implementations, the changelists 222 may relate to numbers in an RCS, and may be provided by users through a GUI front end, such as through manual typing or other data entry. The numbers may also be provided by an RCS automatically, such as by providing all changelist numbers associated with a particular software release. For example, a user may specify particular revisions of the software application to be tested, such as the following revision numbers:
 1234568
 1323894
 345943
 4956865

The revision numbers are provided to the test case management in some implementations so that the system may obtain a list of associated files from the RCS, such as in the following changelist format:
 Change: new
 Client: ebeans
 User: ebeans
 Status: new
 Description:
 <enter description here>
 Files:
 //codedb/myapp/directoryB/directoryA/file1.ipr
 //codedb/myapp/directoryC/file2.jsp
 //codedb/myapp/directoryD/file3.java The file parser 212 may determine, for example, that "file1.ipr," "file2.jsp," and "file3.java" have been changed based on the changelist shown above.

The file parser 212 my also work in other appropriate manners to identify changed files. For example, the file parser may search for all files having a last-changed date that is after a set date. Also, the file parser 212 may be passed a listing of changed files that has been prepared manually or in some other manner. The file parser 212 may also be directed to a particular area, such as a folder, to obtain the names of every file in the particular folder.

The feature finder 214 receives from the file parser 212 a list or other representation of the files identified by the file parser 212. The feature finder 214 is then configured to search through the various feature files 110 in the system, such as feature files stored as part of the hierarchy of code database 104. In some implementations, each directory, or folder, of the code database 104 contains a features file 110. The features file 110 in the same directory as a source code file may describe one or more features associated with the source code file, and with other files in the same directory. In addition, a features file in a directory above the code file may describe one or more features associated with the code file, and with other files under that directory.

Each feature file may include an ordered list of features (though the features need not be in an ordered list, and may be provided in any appropriate manner). At each entry in the list, there may be listed a feature, along with the files or other objects (such as directories) that contain that feature. The file may be in the form of a simple text file. In this manner, programmers can easily access the feature file, and edit features or corresponding source code files in the feature file.

The following is an example of a features file that may be found in the "//codedb/myapp/directoryB/directoryA" directory:
 Feature 1=file1.ipr
 Feature 2=.

This features file indicates that "file1.ipr" is associated with "Feature 1." This indicates that if "file1.ipr" is changed, then any test cases associated with "Feature 1" should be performed in testing the software application. The "." indicates that any files in the directory that are not explicitly identified in the features list are associated with "Feature 2," Which serves as a default feature. The following is an example of a features file that may be found in the "//codedb/myapp" directory:
 Feature 3=directoryE,directoryF
 Feature 4=directoryD,file2.jsp
 Feature 5=directoryE,file3.java
 Feature 6=directoryF
 Feature 7=.

The first line of this features file indicates that all files in "directoryE" and "directoryF" are associated with "Feature 3." Similarly, all files in "directoryD" and the file "file2.jsp" are associated with "Feature 4." Likewise, all files in "directoryE" and the file "file3.java" are associated with Feature 4, and all remaining files are associate with Feature 7.

Files that correspond to particular features may also be represented in various other manners. For example, root expanders or wildcards may be provided and may be interpreted by the system in identifying files. As one example, "search!" in a feature file may cause all files in the same directory as the feature file (or in sub-directories) that begin with the letters "search" to be addressed. In this manner, programmers may group files by their naming conventions, and may more easily associate a group of files with a feature.

Feature files may also be built and maintained semi-automatically or automatically. For example, a simple GUI may be provided to programmers to show a list of all current features for a project, along with all files in the project. The provided files may also be limited to a smaller subset if the programmer is focusing on a specific feature file that has already been created, e.g., the related source code files may be limited to file at or below the directory of the feature file. For features, the current features may be listed in a distinct area of the GUI, and the user may be allowed to drag or otherwise move additional features into the area showing current features for the feature file. The user may also be permitted to create new features that are not yet part of the system 200. In a similar manner, a list of all the source code files that could be associated with a feature may also be listed as a group. A programmer may then be allowed to make a particular feature active by selecting it, and may then select one or more files, such as by dragging or otherwise moving them, next to the relevant feature with which they would like to associate the file.

The application operating the feature file GUI may then compile the information into a feature file using methods well known in the art. For example, various boxes or fields in the GUI may be assembled in a test file, and may be separated by predetermined delimiters so that the system 200 can readily parse the resulting feature files. Such a semi-automatic process for assembling feature files may provide a number of advantages. For example, the process may save programmers time in making correlations between and among features and files. In addition, by accessing file names directly from the code database rather than having users type in the names, such methods may lower the risk of errors in forming feature files. An example GUI for such an application is shown in FIG. 6B.

Based on the two features file examples above and the list of changed files (including file1.ipr, file2.jsp, and file3.java), the feature finder 214 may identify "Feature 1," "Feature 4," and "Feature 5" as features associated with code files that have changed in the revision of the software application to be tested.

The correspondence finder 216 determines which test cases correspond to the features identified by the feature finder 214. The correspondence finder 216 may locate the test cases by querying the test case database 218 using the identified features. The test case database 218 may include information for each test case, such as the feature or features of the software application that the test case tests, the author of the test case, the version of the test case, whether or not the test case may be automated, the objective of the test case, any preconditions in order to perform the test case, the procedure of the test case, the results of performing the test case, and a method of verifying the results of the test case. In some implementations, the test case database 218 is designed to be compatible with a test reporting tool; the actual format for the reporting and the operation of the reporting tool is not critical, and any appropriately provisioned tool would suffice.

The correspondence finder 214 may also identify other files that are flagged in the various feature files 110 as correlating to the features. The system 200 may then test these files also as part of a test case, whether or not a file in this second set of files was changed during the last coding cycle or not. The test cases themselves may be associated with a particular feature when they are created or edited, and thus test cases may be matched to the various features that are located. In this manner, each file affected either directly or indirectly during a coding cycle, as tied together by features related to the files, may be identified and made part of a test case or test case profile.

The profile generator 210 uses the list of test cases and/or list of affected files determined by the correspondence finder 216 to generate a profile 224 that includes test cases 226 to be executed. In one example, the profile 224 includes only the test cases determined by the correspondence finder 216, or only test cases related to the affected files. In another example, the profile 224 may include all test cases or a larger subset of cases than in the first example, with the test cases determined by the correspondence finder 216 having a higher priority or higher location in the list of test cases.

For example, the test case database 218 may include a test case priority used to prioritize the list of test cases in the profile 224, or the frequency with which a test case is determined may be used to prioritize the list of test cases. In addition, a combination of the examples above may be used to filter and prioritize the test cases available in the test case database 218.

Other approaches to prioritizing test cases for execution may also be used. For example, one test case may depend on another test case (such as on its outcome or its affect on the system), so that dependent cases are run after the cases on which they depend. As one example, testing the ability to create a user in software would generally need to come before testing that the user's information can be edited. Also, test cases that test bug fixes may need a higher priority, and test cases on a main code branch or regression test cases may also be given a higher priority.

In some implementations, the profile generator 210 may use a language engine to translate the profile 224. For example, the profile generator 210 may use internationalization rules, such as i18n, to translate the profile 224 into a format that the user may interpret. Also, the profile generator may produce the profile in any manner appropriate for use by a user or by another part of the system in which system 200 resides.

In some implementations, the profile generator 210 may output the profile 224 in a format such as an XML format 228. The XML format 228 may be used, for example, to integrate the profile output with a testing automation framework. The following is an example of a profile in the XML format 228:

```
<profile>
    <testcase_group basepath="proj/feature1/script.sh">
        <testcase automated="true|false" name="">
            <param method="main">Args</param>
            <dependent_testcase>
                <testcase>...</testcase>
            </dependent_testcase>
        </testcase>
        <testcase>...</testcase>
    </testcase_group>
    <testcase_group>...</testcase_group>
</profile>
```

The <profile> includes one or more sets of test cases, denoted by <testcase_group>. For sets of automated test cases, the <testcase_group> includes a "basepath" attribute that specifies the location of a script for automating the test cases in the set. The <testcase_group> includes one or more test cases, denoted by <testcase>. The <testcase> includes an attribute that specifies whether or not the test case is automated, a <param> tag that specifies the parameters of the test case, and any number of <dependent_testcase> tags that specify test cases dependent on the <testcase>.

Figure 3:
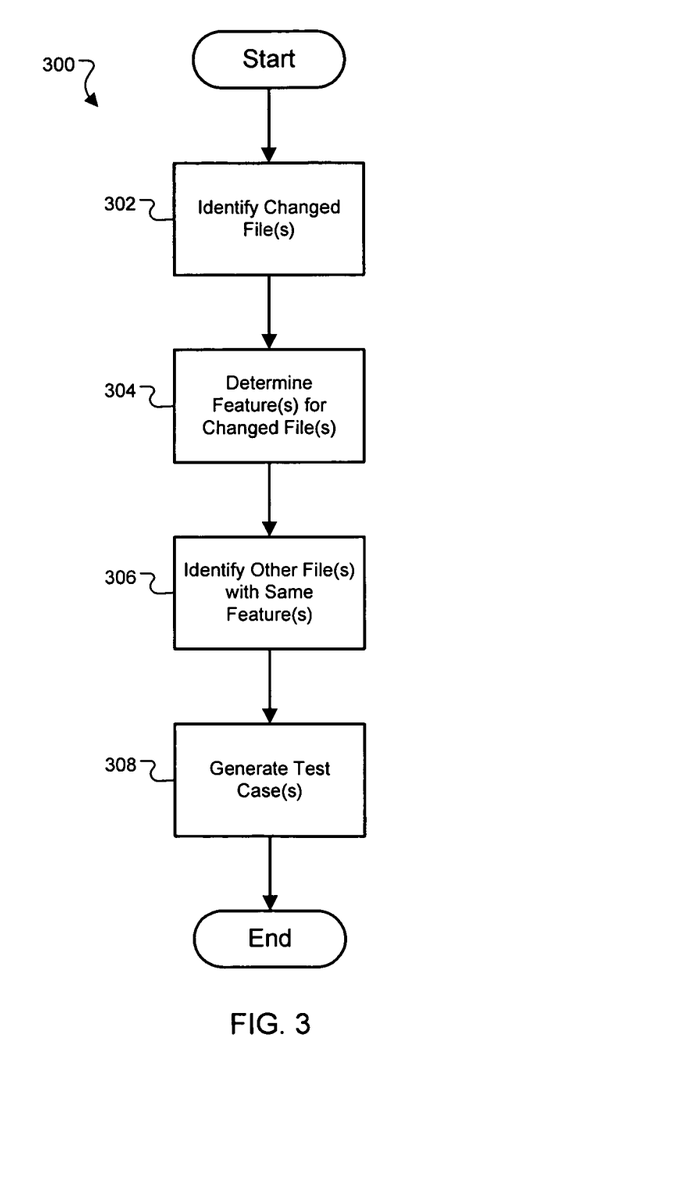
FIG. 3 is a flow chart of an example of a method of operations for identifying software test cases to be executed.

FIG. 3 is a flow chart of an example of a method 300 of operations for identifying or generating software test cases to be executed. The method 300 may be performed, for example, by a system such as the systems 100, 200 and, for clarity of presentation, the description that follows uses the system 100 as the basis of an example for describing the method 300. However, another system, or combination of systems, may be used to perform the method 300.

The method 300 begins at step 302 where one or more changed files are identified. For example, the file parser 212 within the test case manager 102 may identify changed files in the change lists 222 provided by the RCS (i.e., the code database 104), as described above. A user could also provide information manually, such as by providing a list of changelist numbers. Other approaches for identifying changed files may also be used. For example, a system may identify all files that have been updated after a set date. Such files may be presumed to be relevant files, and a system may provide a user with an opportunity to add to or subtract from these presumptively changed files before moving further in the process.

The features associated with the changed files are determined at step 304. For example, a system may search through various files known to be feature files or files that are stored at locations known to contain feature files. The features may be identified by locating all changed or touched files listed in the feature files, and then acquiring any features identified in such files that relate to the changed or touched files.

At step 306, other files with the same feature or features may be determined. For example, when a feature or features are identified in step 304, a system may search through the various feature files to find other source code files or files in groups (e.g., in directories) associated with the feature.

One or more test cases are generated at step 308. The test cases may be cases that relate to the initial files identified as changed or touched, and may also involve test cases for the files that share features with those files that were touched. In one implementation, test cases may be established beforehand (e.g., from a prior testing cycle), and may simply be updated as necessary from information determined from identifying files changed in the most recent cycle. For example, each test case may have previously been associated with one or more files, and may be placed in a test case profile if those associated files are touched or if they correlate to features that in turn correlate to files that have been touched.

From the test cases, such as in the form of a test case profile, a system may carry out a round of testing, such as in a conventional manner. The identified test cases may be run, including in a determined order, and may be monitored to determine whether they operated correctly. In addition, regression test cases may also be run to provide for complete testing of an application or group of applications, particularly when development proceeds through multiple development and testing cycles.

Figure 4:
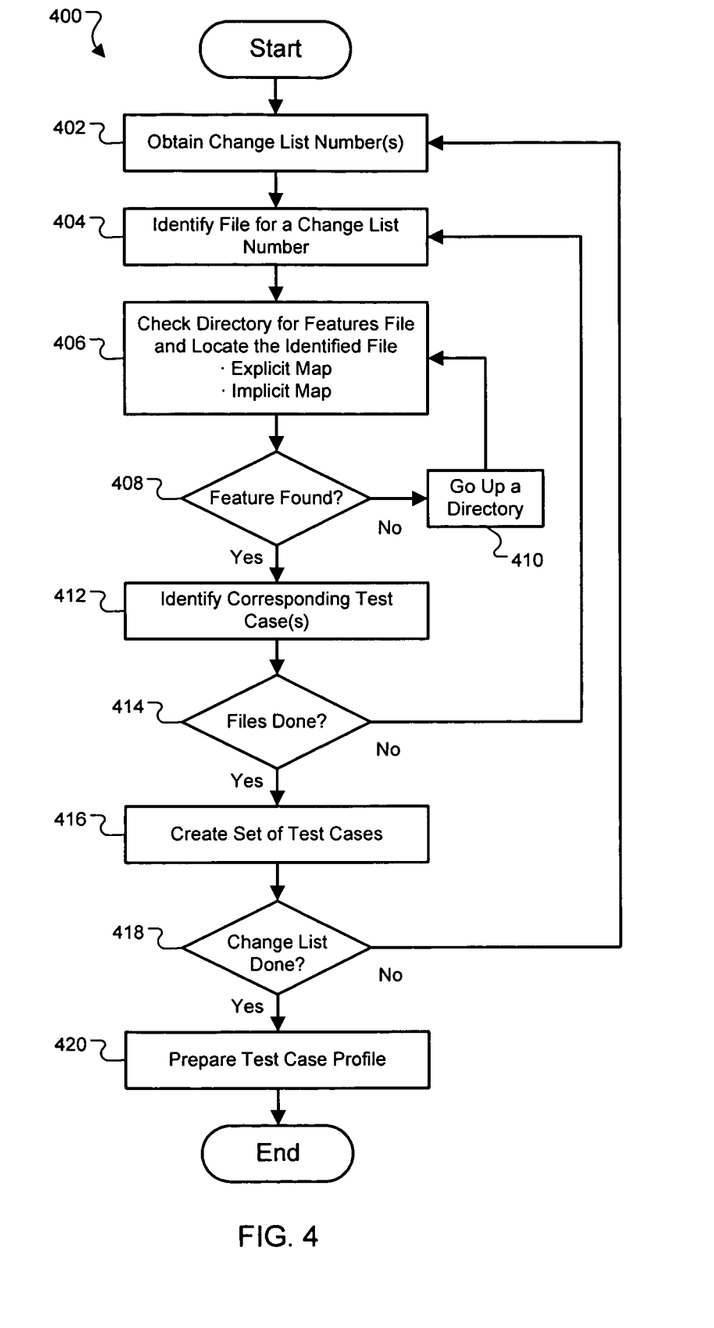
FIG. 4 is a flow chart of an example of a method of operations for preparing a test case profile.

FIG. 4 is a flow chart of an example of a method 400 of operations for preparing a test case profile. The method 400 may be performed, for example, by a system such as the systems 100, 200. In general, the method involves stepping through numbers in a changelist to identify changed files, searching and locating feature files associated with the changed files, and identifying test cases and/or additional files using information in the feature files. The test cases may then be built up into a test case profile.

The method 400 begins at step 402 where one or more changelist numbers of a software application are obtained. The changelist numbers are used to generate lists of files that have changed in the revisions of the software application to be tested. For example, a user may specify, using a user interface, changelist numbers (e.g. RCS revision numbers) for revisions of the software application to be tested. The RCS may provide the lists of changed files corresponding to the changelist revision numbers. The identity of changed files may be determined in various other manners also, as discussed above.

A file within a changelist is identified at step 404. For example, a parser may identify the first file, "file1.ipr," in the change list example above. A system may step through the various changelists locating files. The filenames or other file identifiers may be determined by simple parsing of files having a known format.

A directory is checked, at step 406, for a features file, and an attempt is made to locate the identified changed file in the features file. The features file may be identified as a file having a particular name or format in a defined position relative to a changed file identified in the changelist. For example, the features file may be a file called "features.txt" or a similar name in the directory of the changed source code file, or in a higher directory. As such, there may be multiple features files having the same name, and their relevance to a particular changed source code file may be determined by the position in the file storage hierarchy relative to the changed source code file.

The changed file may be explicitly associated with a feature in the features file with its filename, or it may be implicitly associated with a feature using a default or wild card name. For example, a feature finder may find that the "Feature 1" is associated with the changed "file1.ipr." Other correlations between features and files may also be used as appropriate.

If, at step 408, a feature associated with the changed file is found, then the method 400 proceeds to step 412, where one or more test cases or other source code files corresponding to the feature are identified. If a feature is not found, then the method 400 proceeds to step 410 and 406, where the next directory above the current directory is checked for a features file. For example, following the finding of the "Feature 1," a correspondence finder identifies one or more test cases or source code files associated with the feature.

If, at step 414, there are no more changed files listed in the changelist, then the method 400 proceeds to step 416, where a set of test cases is created. If there are more changed files, then the method 400 returns to step 404, where another file within the changelist is identified. The process may then repeat as many times as necessary to capture all of the changelists and changed files identified by the changelists.

If, at step 418, there are no more changelists, then the method 400 proceeds to step 420 where a test case profile is prepared. If there are more change lists, then the method 400 returns to step 402. For example, the profile generator 210 may generate an XML format profile as shown above, based on the test cases determined by the change lists 222 and the features files 110.

Figure 5:
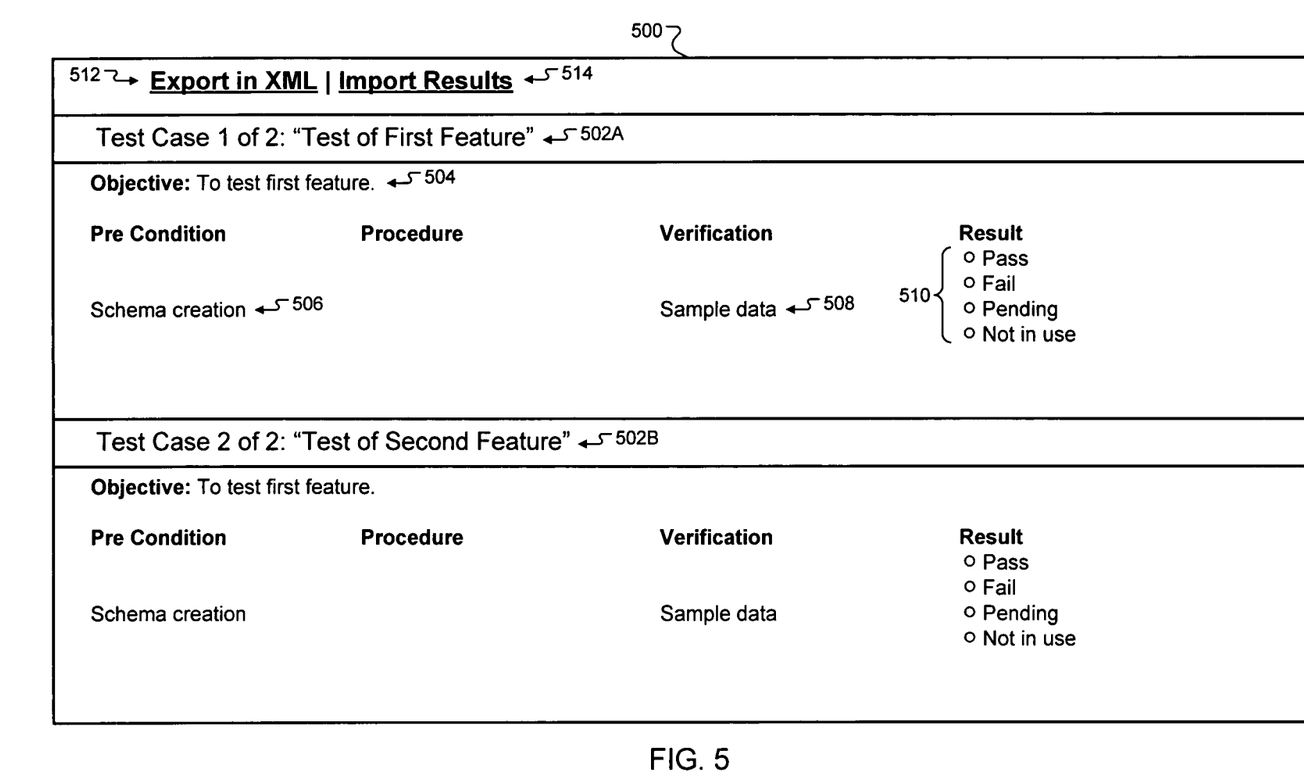
FIG. 5 is an example of a user interface of a test case manager showing test cases to be executed.

FIG. 5 is an example of a user interface 500 of a test case manager showing test cases to be executed. The interface 500 shows the details of two test cases 502A-B. The details of the test case 502A include an objective 504 of the test case 502A, a precondition 506 of the test case 502A, a verification method 508 of the results of the test case 502A, and a result 510 of the test case. Similarly, an objective, precondition, procedure, verification, and result may be presented for other test cases within the interface 500.

The objective 504 may simply be a textual description to inform an observer (whether, e.g., a QA engineer or a programmer) why the test case or group of test cases is being run.

For example, an objective may be to confirm that a particular bug in a program had been eradicated. The precondition may define a requirement or requirements for the execution of a test case. For example, to test a login page, the precondition may be to "ensure that username userA exists in the system and has the password userA_Pass." The related procedure may be "Go to the login screen and type in userA and userB_Pass." The verification may be "The login page should redirect you back to the login page with an error message that says that userA could not be logged in because the password is incorrect." If the verification is true, then the test case (which in the example is a negative test case) is a PASS.

The verification 508 may define steps to be taken in determining whether the test cases run successfully. The verification method may also include one or more references to data on which that test case is to operate, along with, optionally, output that the test case should match if it performs correctly. Such exemplary output would not be required, for example, if the test case is intended simply to determine whether the software can execute without getting hung up. The references to data may be, for example, pointers of various sorts to databases that serve to provide input data for the system. Thus for example, where the software relates to searching systems, the database may consist of a number of exemplary search requests, along with a database of content on which the search requests are to be run.

As an another example of taking data, an engineer may be testing that a sweepstakes entry form on a web page takes addresses for various countries (because address formats, e.g., with zipcodes, can vary widely). The web page may return the address to the user and thank the user for an entry. The provided data may simply be the addresses, in various country formats, to bused as input for the form, and also the address that is returned. In conducting a test, an engineer may then repeat the same test case multiple times—each time using data for a different country.

In addition, the interface 500 allows the user to export the test case profile using an export control 512. The profile may be exported, for example, to a testing automation framework, such as TAU. The interface 500 also allows the user to import test results using an import results control 514. Imported test results, along with generated test results, may be analyzed using a test reporting tool. As shown, multiple test cases may be shown in a single display; in addition, statistical analysis may be performed on the results, and reports may also be provided on the status of various test cases or groups of test cases.

Figure 6A:
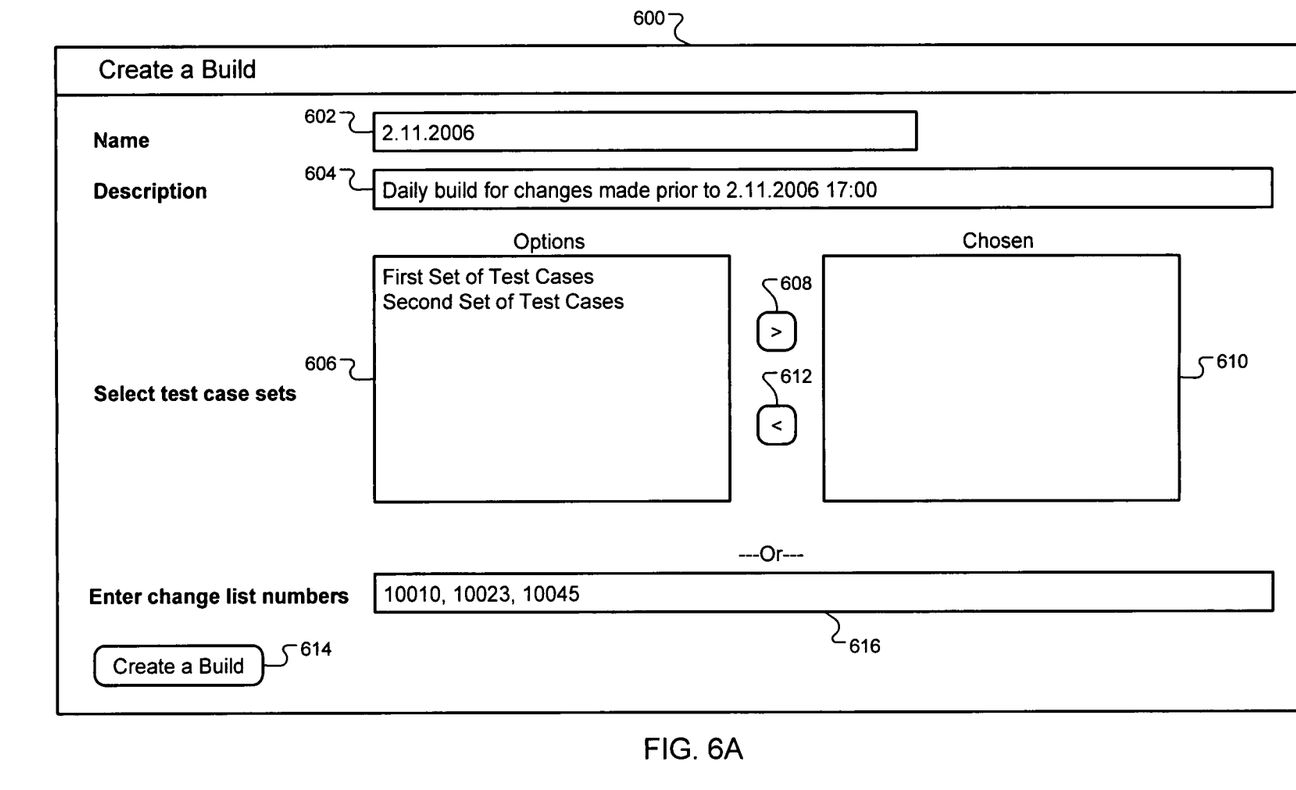
FIG. 6A is an example of a user interface of a test case manager that allows a user to select sets of test cases or specify change list numbers for a test case profile.
Figure 6B:
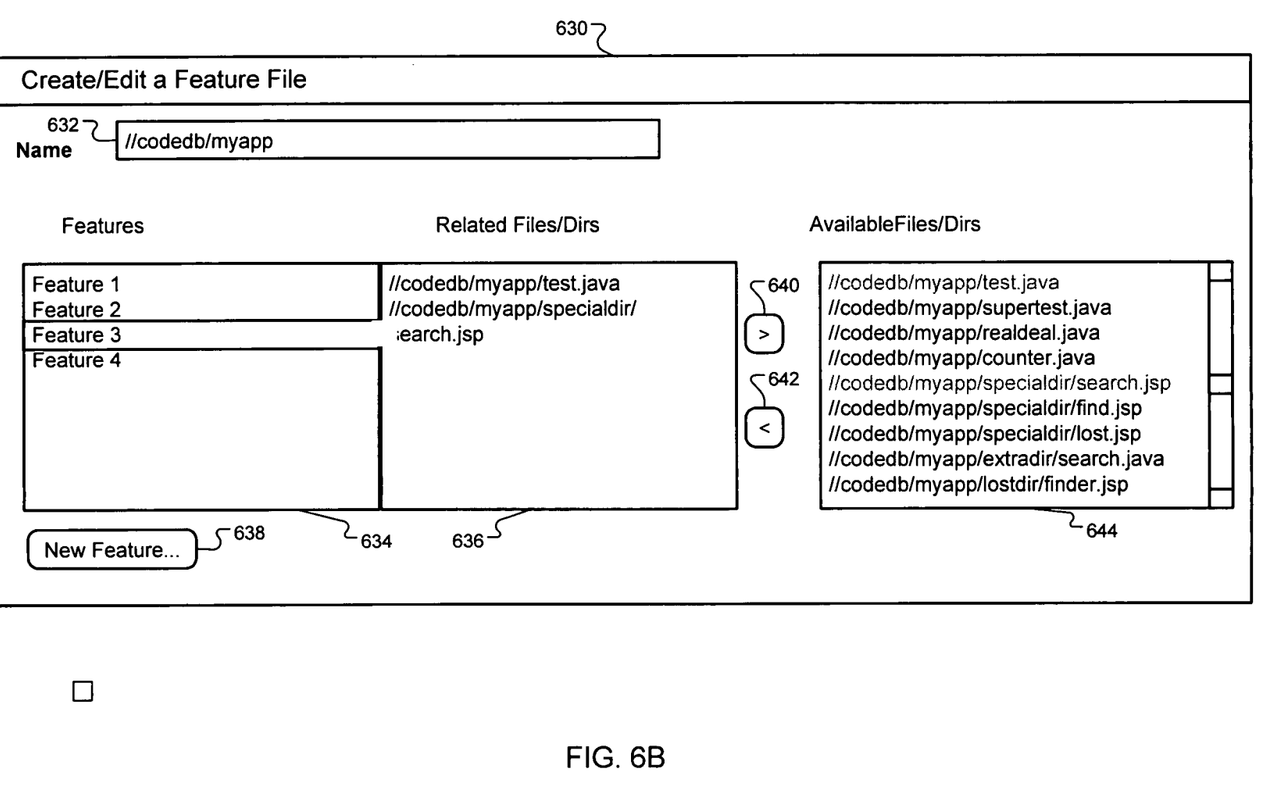
FIG. 6B shows a user interface for building a feature file.

FIG. 6A is an example of a user interface 600 of a test case manager that allows a user to select sets of test cases or specify change list numbers for a test case profile. The interface 600 includes a name input field 602 that allows the user to specify a name for the profile. The interface 600 also allows the user to specify a description of the profile using a description input field 604.

The interface 600 presents a list of available test case sets in options area 606. The user may select sets of test cases in the options area 606 and then select the "add" control 608 to add the selected test case sets to a chosen area 610. Alternatively, the user may select test case sets in the chosen area 610 and then select the "remove" control 612 to remove test case sets from the chosen area 610.

The user may initiate a build of the profile including the test case sets in the chosen area 610 by selecting a create build control 614. Alternatively, the user may make an input in a change list numbers input field 616 specifying the change list numbers (e.g. RCS revision numbers) to use when determining the test cases and/or the prioritization to be used in the profile. The user may select the create build control 614 to generate the profile using the change list numbers specified in the change list numbers field 616.

FIG. 6B shows a user interface 630 for building a feature file. Each display of the interface may relate to an access of a particular feature file that contains feature identifiers and corresponding file or directory identifiers related to each feature. A file selector 632 allows a user to enter a fill name of a particular feature file, and shows that feature file's identity while the feature file is open for editing.

Two text boxes 634, 636 show, respectively, the names of all the features in the file, and the source code files or directories associated with a feature. Here, there are only associated files, and no associated directories. In the figure, the user has selected Feature 3, as shown by the tab extending around that feature, so that the interface 630 shows in text box 636 all files relating to Feature 3. In this example, there are two files.

Text box 644 shows all files that may relate to the feature file that is being edited. In other examples, text box 644 could also show entire directories or sub-directories, and all the boxes could provide graphical representations. Files may be made into related files using the "add" control 640, and may be made into unrelated files if they are already related, by using the "remove" control 642—all in a conventional manner. In the exemplary display 630, two of the files in the text box 644 are shown in light gray so that the user can quickly appreciate that those files already reside in text box 638.

Control button 638 may allow a user to create new features. Selecting the button 638 may simply add a new consecutively number feature to the bottom of the list of features. Alternatively, the user may be given an opportunity to name the feature, and also to provide additional parameters relating to the feature (e.g., a description of the subject matter to which the feature relates). Other modes of identifying a new feature my also be provided, including by permitting a user to borrow from an already-created feature located either in the same area as the current feature file, in a different part of the same project, or in a different project entirely.

Figure 7:
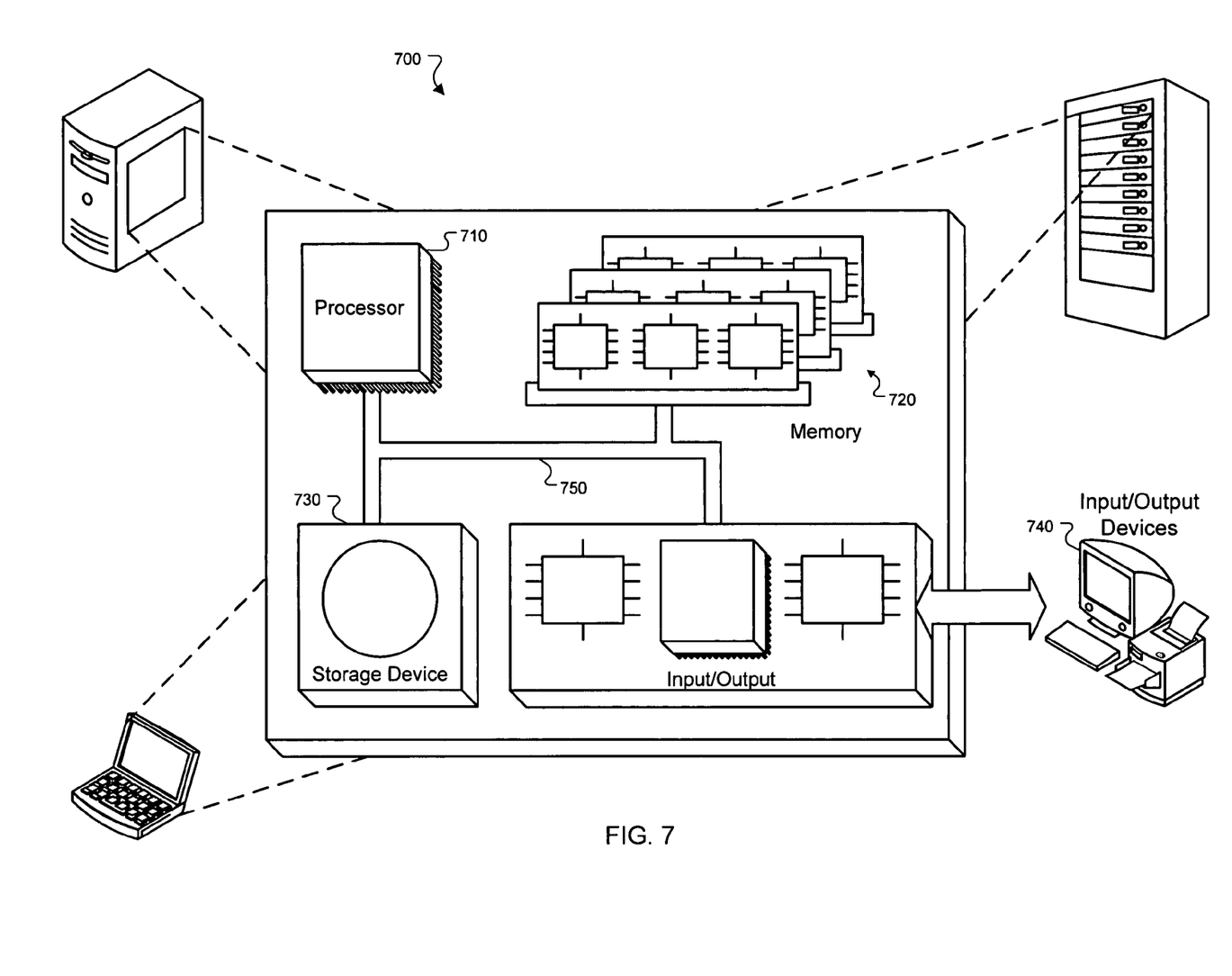
FIG. 7 is a schematic diagram of an example of a generic computer system.

FIG. 7 is a schematic diagram of an example of a generic computer system 700. The system 700 can be used for the operations described in association with the method 300 according to one implementation. For example, the system 700 may be included in either or all of the test case manager 102, the code database 104, or the programming consoles 108.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the test case manager 102, the code database 104, and/or the programming consoles 108 may be implemented within the same computer system. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method of identifying software test cases to be executed, comprising:
    determining, by a computer system, a change in content in one or more primary source code files of a software application;
    accessing a hierarchical arrangement of files, in which a relative position of feature files for a feature is ordered at or above a position of (i) one or more primary source code files for the feature, and (ii) one or more secondary source code files for the feature;
    locating, in the hierarchical arrangement, the one or more primary source code files of the software application associated with the change in content;
    identifying, in the hierarchical arrangement, feature files that are ordered at or above a position of the one or more primary source code files of the software application associated with the change in content, with the feature files comprising references to the one or more primary source code files of the software application associated with the change in content, wherein the feature files comprise mappings of an ordered list of one or more features that are affected by the change in content to files and directories of files associated with the one or more features that are affected by the change in content, and wherein the one or more features comprise an expected behavior of the software application that may be added to the software application incrementally;
    determining, from the feature files, the one or more features that are affected by the change in content;
    querying a test case database for one or more test cases that correspond to the one or more features that are affected by the change in content;
    determining, from the mappings in the feature files, one or more secondary source code files associated with the one or more primary source code files of the software application associated with the change in content;
    generating a test case profile based on the one or more primary source code files of the software application associated with the change in content, the one or more test cases, and the one or more secondary source code files; and
    causing the one or more test cases in the test case profile to be executed.

2. The method of claim 1, wherein determining from the feature files, the one or more features that are affected by the change in content comprises parsing a list of files in one or more changelists.

3. The method of claim 2, wherein the one or more changelists are obtained from a revision control system.

4. The method of claim 1, further comprising:
searching at least one of the feature files in successively higher directories at or above one or more directories comprising the one or more primary source code files of the software application associated with the change in content and the one or more secondary source code files, until one or more features associated with the one or more secondary source code files are identified.

5. The method of claim 1, wherein determining the one or more secondary source code files comprises analyzing a list of the one or more features, with the list comprising information that lists one or more files or a group of files that correspond to the one or more secondary source code files.

6. The method of claim 1, further comprising prioritizing the test cases for execution.

7. The method of claim 6, further comprising executing the test cases in order of priority and generating a test case report reflecting a reliability indication of the software project.

8. The method of claim 1, wherein the step of generating a test case profile further comprises automatically generating the test case profile that lists the test cases for execution in a software quality assurance cycle.

9. The method of claim 8, further comprising transmitting the test case profile in the form of an XML message for automated execution by a test case system.

10. A test-case generation system, comprising:
one or more processors; and
one or more non-transitory machine-readable storage devices configured to store instructions that are executable by the one or more processing devices to perform operations comprising:
determining, by a computer system, a change in content in one or more primary source code files of a software application;
accessing a hierarchical arrangement of files, in which a relative position of feature files for a feature is ordered at or above a position of (i) one or more primary source code files for the feature, and (ii) one or more secondary source code files for the feature;
locating, in the hierarchical arrangement, the one or more primary source code files of the software application associated with the change in content;
identifying, in the hierarchical arrangement, feature files that are ordered at or above a position of the one or more primary source code files of the software application associated with the change in content, with the feature files comprising references to the one or more primary source code files of the software application associated with the change in content, wherein the feature files comprise mappings of an ordered list of one or more features that are affected by the change in content to files and directories of files associated with the one or more features that are affected by the change in content, and wherein the one or more features comprise an expected behavior of the software application that may be added to the software application incrementally;
determining, from the feature files, the one or more features that are affected by the change in content;
querying a test case database for one or more test cases that correspond to the one or more features that are affected by the change in content;
determining, from the mappings in the feature files, one or more secondary source code files associated with the one or more primary source code files of the software application associated with the change in content;
generating a test case profile based on the one or more primary source code files of the software application associated with the change in content, the one or more test cases, and the one or more secondary source code files; and
causing the one or more test cases in the test case profile to be executed.

11. The system of claim 10, wherein the functions further comprise:
identifying changelists entered into the system; and
parsing the one or more primary source code files from the changelists.

12. One or more non-transitory machine-readable storage devices configured to store instructions that are executable by one or more processing devices to perform operations comprising:
determining a change in content in one or more primary source code files of a software application;
accessing a hierarchical arrangement of files, in which a relative position of feature files for a feature is ordered at or above a position of (i) one or more primary source code files for the feature, and (ii) one or more secondary source code files for the feature;
locating, in the hierarchical arrangement, the one or more primary source code files of the software application associated with the change in content;
identifying, in the hierarchical arrangement, feature files that are ordered at or above a position of the one or more primary source code files of the software application associated with the change in content, with the feature files comprising references to the one or more primary source code files of the software application associated with the change in content, wherein the feature files comprise mappings of an ordered list of one or more features that are affected by the change in content to files and directories of files associated with the one or more features that are affected by the change in content, and wherein the one or more features comprise an expected behavior of the software application that may be added to the software application incrementally;
determining, from the feature files, the one or more features that are affected by the change in content;
querying a test case database for one or more test cases that correspond to the one or more features that are affected by the change in content;
determining, from the mappings in the feature files, one or more secondary source code files associated with the one or more primary source code files of the software application associated with the change in content;
generating a test case profile based on the one or more primary source code files of the software application associated with the change in content, the one or more test cases, and the one or more secondary source code files; and
causing the one or more test cases in the test case profile to be executed.

13. The one or more machine-readable storage devices of claim 12, wherein determining from the feature files, the one or more features that are affected by the change in content comprises parsing a list of files in one or more changelists.

14. The one or more machine-readable storage devices of claim 12, wherein determining the one or more secondary source code files comprises analyzing a list of the one or more features, with the list comprising information that lists one or more files or a group of files that correspond to the one or more secondary source code files.

15. The one or more machine-readable storage devices of claim 12, wherein the operations further comprise:
   prioritizing the test cases for execution.

16. The system of claim 10, wherein the operations further comprise:
   searching at least one of the feature files in successively higher directories at or above the one or more directories comprising the one or more primary source code files of the software application associated with the change in content and the one or more secondary source code files, until one or more features associated with the one or more secondary source code files are identified.

17. The system of claim 10, wherein determining the one or more secondary source code files comprises analyzing a list of the one or more features, with the list comprising information that lists one or more files or a group of files that correspond to the one or more secondary source code files.

18. The system of claim 10, wherein the operations further comprise:
   prioritizing the test cases for execution.

19. The system of claim 18, wherein the operations further comprise:
   executing the test cases in order of priority and generating a test case report reflecting a reliability indication of the software project.

20. The system of claim 10, wherein the operations for generating a test case profile further comprise:
   automatically generating the test case profile that lists the test cases for execution in a software quality assurance cycle.

\* \* \* \* \*